April 28, 1942.  T. S. GLOVER  2,280,909
SHACKLE
Filed Jan. 3, 1942  2 Sheets-Sheet 1

Inventor
Thomas Scott Glover
by
Pennie, Davis, Marvin & Edmonds
Attorneys

April 28, 1942.  T. S. GLOVER  2,280,909
SHACKLE
Filed Jan. 3, 1942  2 Sheets-Sheet 2

Inventor
Thomas Scott Glover

Patented Apr. 28, 1942

2,280,909

UNITED STATES PATENT OFFICE 2,280,909

SHACKLE

Thomas Scott Glover, Airdrie, Scotland

Application January 3, 1942, Serial No. 425,533
In Great Britain February 6, 1941

1 Claim. (Cl. 59—86)

This invention relates to an improved construction of shackle body capable of being produced with accuracy of length at less cost than existing constructions.

The shackle body construction according to the invention comprises three portions, namely, a bow member made from a piece of steel bar, bent and/or forged to U-shape, and a pair of eye members made to the desired shape by drop stamping or forging and each having a shank.

The shanks of the eye members are welded to the ends of the bow member as by automatic resistance welding, or by electric arc welding.

Where automatic resistance welding is resorted to, there are provided at the butting faces flashing allowances which are sparked off during the welding operation. When electric arc welding is resorted to the shanks and the ends of the bow member are chamfered to afford gaps for reception of the weld metal.

Figure 1:
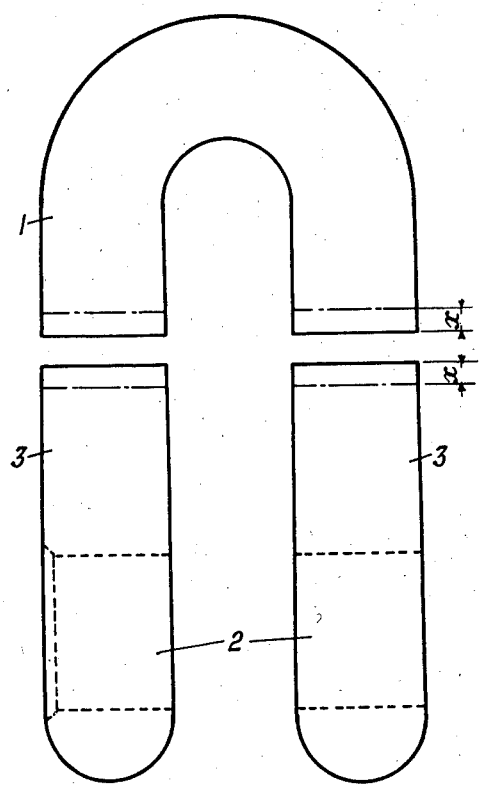
Figure 2:
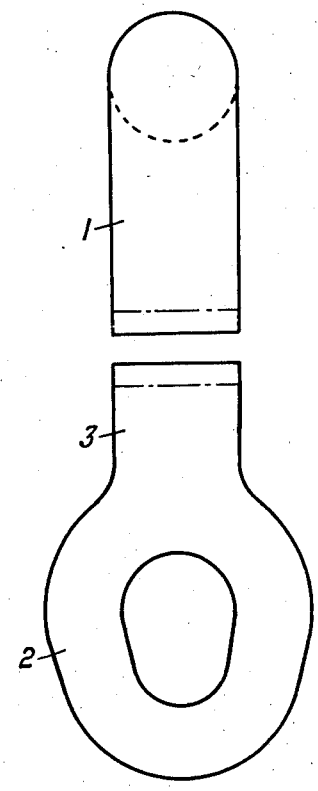
Figure 3:
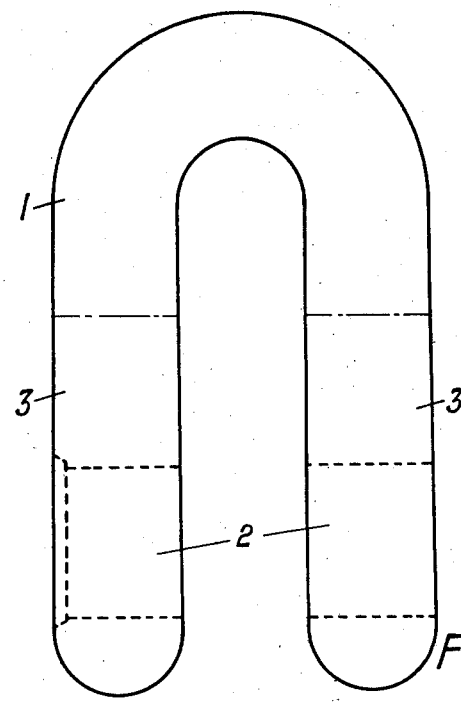
Figure 4:
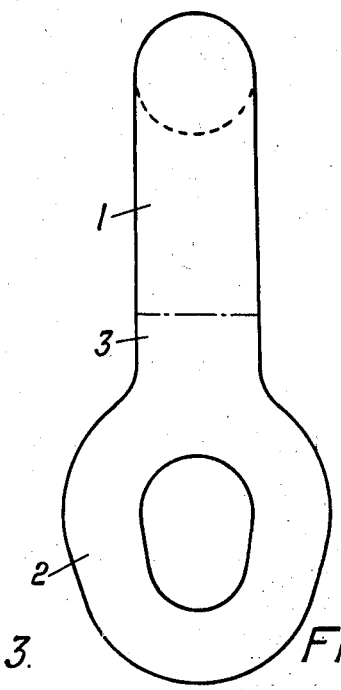
Figure 5:
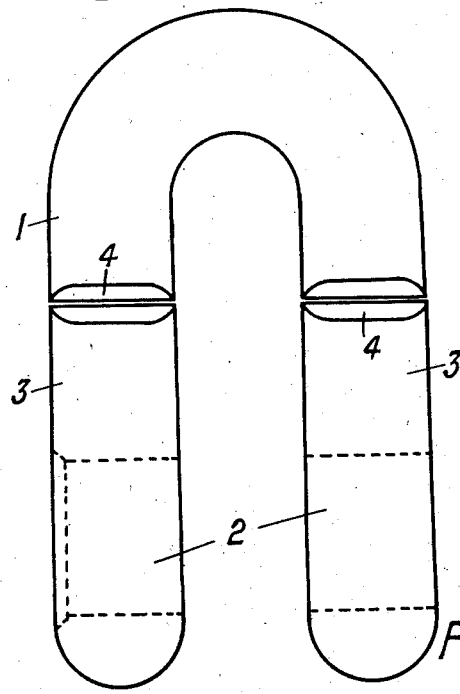
Figure 6:
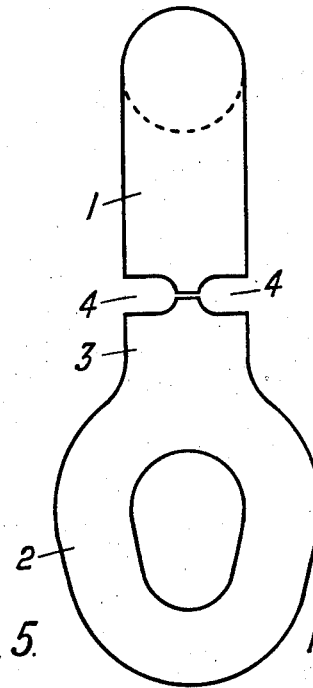

The invention is illustrated by way of example in the accompanying drawings, in which Figs. 1 and 2 are views at right angles to one another showing the three components forming the shackle body before they are united by flash welding; Figs. 3 and 4 are similar views of the finished shackle body, the weld lines being indicated by chain-dotted lines. Figs. 5 and 6 are views similar to Figs. 1 and 2, showing the shackle body components prepared for uniting by electric arc welding.

The same reference letters indicate similar parts in the several views.

As shown clearly in Figs. 1 and 2, the shackle body comprises a bow member 1 made from a piece of steel bar bent or formed to U-shape, and a pair of eye members 2 made to the desired shape by drop stamping or forging and each having a cylindrical shank 3.

At the butting faces of the bow member 1 and the shanks 3 there are provided flashing allowances $x$ which are sparked off when the three components are welded by automatic resistance welding.

As shown in Figs. 5 and 6, the bow member 1 and the shanks 3 are prepared for uniting by electric arc welding, the butting ends of these components being formed with chamfered steps affording gaps 4 for reception of the weld metal.

What is claimed is:

A shackle body comprising a bow member made from a piece of steel bar shaped to U-form and a pair of eye members each having a shank, said shanks being welded to the ends of the bow member.

T. SCOTT GLOVER.